United States Patent
Raff et al.

(10) Patent No.: US 10,242,786 B2
(45) Date of Patent: Mar. 26, 2019

(54) ELECTROMAGNETIC VALVE AND SAFETY-RELATED PNEUMATIC SYSTEM

(71) Applicant: ETO Magnetic GmbH, Stockach (DE)

(72) Inventors: Viktor Raff, Constance (DE); Oliver Thode, Stockach (DE)

(73) Assignee: ETO Magnetic GmbH, Stockach (DE)

( * ) Notice: Subject to any disclaimer, the term of this patent is extended or adjusted under 35 U.S.C. 154(b) by 13 days.

(21) Appl. No.: 15/124,828

(22) PCT Filed: Jan. 22, 2015

(86) PCT No.: PCT/EP2015/051286
§ 371 (c)(1),
(2) Date: Sep. 9, 2016

(87) PCT Pub. No.: WO2015/135673
PCT Pub. Date: Sep. 17, 2015

(65) Prior Publication Data
US 2017/0018345 A1    Jan. 19, 2017

(30) Foreign Application Priority Data
Mar. 11, 2014    (DE) .................. 10 2014 103 246

(51) Int. Cl.
*H01F 7/121*    (2006.01)
*H01F 7/16*    (2006.01)
(Continued)

(52) U.S. Cl.
CPC .......... *H01F 7/1607* (2013.01); *B60T 13/683* (2013.01); *F16K 31/0675* (2013.01); *H01F 7/121* (2013.01)

(58) Field of Classification Search
CPC .. H01F 7/121; H01F 7/1607; H01F 2007/163; F16K 31/0655; F16K 31/0658; F16K 31/0675
(Continued)

(56) References Cited

U.S. PATENT DOCUMENTS 4,097,833 A * 6/1978 Myers ................ H01F 7/13
335/261
4,341,241 A    7/1982 Baker
(Continued)

FOREIGN PATENT DOCUMENTS

CH    481 366 A    11/1969
CN    102177057 A    9/2011
(Continued)

OTHER PUBLICATIONS

Chinese Office action for Chinese Patent Application No. 201580012763.0 dated Apr. 26, 2017.

*Primary Examiner* — Seth W. Mackay-Smith
(74) *Attorney, Agent, or Firm* — Bachman & LaPointe, PC

(57) ABSTRACT

An electromagnetic valve for safety-related pneumatic systems in motor vehicles, with an armature (9), which, by means of current supplied to an electrical winding (6), can be displaced axially relative to a core (13) and relative to a first valve seat (2), inside an inner channel of a coil carrier carrying the winding (6) on a winding section, wherein, in the armature (9) is arranged a guide channel, into which projects axially a guide pin (3) formed integrally with the coil carrier (1), so as to guide the armature (9) in the course of its axial displacement.

18 Claims, 4 Drawing Sheets

(51) Int. Cl.
*F16K 31/06* (2006.01)
*B60T 13/68* (2006.01)

(58) Field of Classification Search
USPC .................................................. 251/129.15
See application file for complete search history.

(56) References Cited

U.S. PATENT DOCUMENTS

| | | | |
|---|---|---|---|
| 7,192,005 B2* | 3/2007 | Denyer | ............... F16K 31/0613 |
| | | | 137/625.64 |
| 2008/0272208 A1* | 11/2008 | Anderson | ............ B65D 83/262 |
| | | | 239/302 |
| 2010/0252761 A1 | 10/2010 | Robertson, III | |
| 2010/0294966 A1* | 11/2010 | Czimmek | ............... F02B 37/16 |
| | | | 251/129.15 |
| 2011/0089350 A1* | 4/2011 | Beneker | .................... F01L 1/34 |
| | | | 251/129.15 |

FOREIGN PATENT DOCUMENTS

| | | | | |
|---|---|---|---|---|
| DE | 93 00 039 U1 | | 4/1993 | |
| DE | 41 39 670 A1 | | 6/1993 | |
| DE | 4419875 A1 | * | 12/1995 | ......... F16K 31/0606 |
| DE | 10 2004 001 565 A1 | | 8/2005 | |
| DE | 10 2005 039 640 A1 | | 3/2007 | |
| DE | 10 2006 055 833 A1 | | 5/2008 | |
| DE | 10 2008 042 731 A1 | | 4/2010 | |
| DE | 10 2008 060 483 A1 | | 6/2010 | |
| EP | 0 418 502 A2 | | 3/1991 | |
| JP | 2009513890 A | | 4/2009 | |
| WO | 2009054848 A1 | | 4/2009 | |

* cited by examiner

ELECTROMAGNETIC VALVE AND SAFETY-RELATED PNEUMATIC SYSTEM

BACKGROUND OF THE INVENTION

The invention relates to an electromagnetic valve, in particular for safety-related pneumatic systems in motor vehicles, with an armature, which, by means of current supplied to an electrical winding, can be displaced axially relative to a core and relative to a first valve seat, inside an inner channel of a coil carrier carrying the winding on a winding section. Furthermore, the invention concerns a safety-related pneumatic system, in particular a pneumatic braking system for motor vehicle applications, in particular for commercial vehicle applications, preferably an ABS or an EBS system.

From DE 93 000 39 U1 an electromagnetic valve is of known art, whose displaceable armature is guided in the course of its axial displacement on the inner periphery of a coil carrier. DE 41 39 670 C2 shows an alternative electromagnetic valve in which such an armature guide is similarly implemented. In addition, the document shows the integral formation of the valve seat with the coil carrier. What is disadvantageous in the electromagnetic valve of known art, however, is the necessarily massive armature, which is responsible for a high weight and high production costs. Moreover, the damping with respect to the core is implemented in a complex manner via a spring pin positioned in the armature. The sealing function with respect to the valve seat is achieved by means of a sealing element that is axially spaced apart from the spring pin.

Preceding designs of electromagnetic valves have not been successfully implemented for safety-related applications, for example for ABS or EBS brake valves in commercial vehicle compressed air brakes, since their functional efficiency is not guaranteed under all conditions of deployment. Thus, in the extreme case, for example as a result of unintentional excess current, the result can be overheating of the winding (coil), as a result of which the coil carrier can reduce its inner diameter, which in forms of embodiment of known art defines the guide clearance for the armature, which brings with it the risk of armature seizure. This can be ascribed to the fact that the winding, which is fitted with an appropriate winding tension, is responsible for the fact that in the event of heating the plastic of the coil carrier does not expand outwards, or only to a limited extent, but rather is forced radially inwards, which leads to the above-referred to problematic reduction of the coil carrier inner diameter.

From DE 10 2005 039 640 A1 an electromagnetic valve for pneumatic systems in motor vehicles is of known art, which has an armature, which, by means of current supplied to an electrical winding, can be displaced axially relative to a core and relative to a first valve seat, inside an inner channel of a coil carrier carrying the winding.

Cited with reference to other prior art that is concerned with electrical valves, are DE 10 2008 042 731 A1, US 2010/0252761 A1, DE 10 2008 060 483 A1, DE 10 2006 055 833 A1, DE 10 2004 001 565 A1, DE 102 53 769 A1, and U.S. Pat. No. 4,341,241 A.

SUMMARY OF THE INVENTION

Based on the above-cited prior art, the object underlying the invention is therefore that of specifying an electromagnetic valve with an armature that can be displaced inside an internal channel of a coil carrier for purposes of limiting the axial build length, in which the risk of armature seizure is minimised, in particular so as to be able to deploy the electromagnetic valve for safety-related pneumatic systems in motor vehicles, in particular in commercial vehicles. The task furthermore consists in specifying a safety-related pneumatic system, in particular a braking system, with at least one such electromagnetic valve.

With regard to the electromagnetic valve this task is achieved with the features disclosed herein, i.e. by means of a generic electromagnetic valve, in that a guide channel is provided in the armature, into which projects a guide pin formed integrally with the coil carrier so as to guide the armature in the course of its axial displacement. With regard to the safety-related pneumatic system the task is achieved with the features disclosed herein.

Advantageous further developments of the invention are specified in the subsidiary claims. Within the framework of the invention all combinations originate from at least two of the features disclosed in the description, the claims, and/or the figures.

For purposes of avoiding armature seizure and at the same time for purposes of accommodation of the armature, formed as a stub sleeve, or as a sleeve, at least in some sections inside an internal channel of the coil carrier, the concept underlying the invention is that of not guiding, or not exclusively guiding, the armature on its outer periphery, as in the prior art, but rather instead to implement an armature inner guide, and in particular by means of an axial guide pin, on whose outer periphery the armature is guided, with the inner periphery having a guide diameter of a guide channel provided in the armature, wherein the guide pin, for purposes of ensuring optimal axial parallellism and for purposes of minimising assembly complexity, is formed integrally with the coil carrier (winding carrier) and projects axially into a winding section of the coil carrier carrying the winding. Expressed in other words, the coil carrier extends in the axial direction beyond its winding section provided with a winding, so as then in a region radially further inwards to project axially back into the winding section, and to guide the armature in a region inside the winding section in the course of its axial displacement. By this means it is possible to increase the radial clearance (air gap) between the armature outer diameter, and the coil carrier inner diameter, more precisely the inner channel inner diameter, so that even in the event of a reduction of the inner channel inner diameter as a consequence of overheating there is no longer any risk of armature seizure. The guide pin itself is thereby located sufficiently radially spaced apart from the critical hot region of the winding, in particular it is also spaced apart via the armature itself, so that any possible expansion caused by temperature of the outer diameter of the guide pin turns out to be comparatively small, with the consequence that the guide clearance between the outer diameter of the guide pin and the inner periphery of the armature can be designed to be significantly smaller. This in turn advantageously influences the tribological wear and thus ensures, at the same time with a minimised risk of armature seizure, the service life of the electromagnetic valve designed in accordance with the concept of the invention, which predestines the latter for deployment in safety-related motor vehicle pneumatic systems.

The armature is preferably guided on the guide pin over at least half the axial extent of the armature. If required, the armature, in the course of an axial displacement, in addition to the armature inner guide that has been implemented, can be guided on its outer periphery on the coil carrier, preferably at least in some sections, more preferably completely outside the winding section in axial terms.

The electromagnetic valve designed in accordance with the concept of the invention can be designed solely with one, namely the first, valve seat, and then preferably in the form of a 2/2-way valve, wherein the single (first) valve seat can then alternatively be provided on the guide pin, particular on the end face of the latter, by means of integral formation with the guide pin, which is preferred, or it can be located opposite in the region of the core, either formed directly on the core, or on a valve seat component accommodated in the core, preferably passing through the latter. The form of embodiment with a first valve seat provided on the guide pin is particularly suitable for a form of embodiment that is closed in the unpowered state, in particular by means of return springs arranged axially between the armature and the core, while the form of embodiment with a single valve seat arranged in the region of the core is particularly suitable for a form of embodiment that is open in the unpowered state, similarly by means of return springs arranged axially between the armature and the core. In a form of embodiment as a valve that is closed in the unpowered state, it is preferable if a supply channel, assigned directly to the first valve seat, leading to a supply port, preferably runs as a central channel inside the armature, and if the compressed air is subsequently led away, or is led to a working port, via channels provided on the outer periphery of the guide pin, or via at least one such channel.

Alternatively, as referred to, the embodiment with two valve seats can be implemented, namely with a first valve seat and a second valve seat that is axially spaced apart from the latter, wherein one of the valve seats is provided on the guide pin, while the other valve seat is provided in the core region, either directly on the core, or in a valve seat component or element arranged in the core. The form of embodiment with a first and second valve seat is particularly suitable for the design of the electromagnetic valve as a 3/2-way valve, preferably with a first valve seat that is closed in the unpowered state.

A further important advantage of the inventive electromagnetic valve consists in the fact that the armature is significantly reduced in weight compared with a solution of solid material. In principle it is possible to design the sleeve-form or stub sleeve-form armature, at least in some sections, as a turned part, wherein cost-effective production by means of sintering, or cold flow pressing, in any event as a mould-dependent component, is preferred. The resulting weight reduction is also advantageous for the magnetic design, amongst other features, for the copper content of the winding, since with the same level of vibration resistance a preferably provided return spring, against whose spring force the armature can be axially displaced when current is supplied to the winding, can be designed to be weaker than is the case in a comparable armature of solid material.

In a further development of the invention provision is advantageously made for the guide pin to project into the internal channel to the extent that it is located radially inside the winding, as is also preferably a first valve seat provided on the guide pin. It is particularly preferable if the guide pin projects axially into the winding section over at least a quarter of the axial extent of the winding, that is to say of the winding section, very particularly preferably over at least a third of the axial extent of the winding section, even more preferably over at least approximately half the axial extent of the winding section, so that a minimum axial build length is possible with good functionality and mounting of the core optimised in terms of build space, preferably inside the coil carrier.

It is particularly appropriate if the radial guide clearance between the outer periphery of the guide pin and the inner periphery of the armature is smaller than a radial clearance between the outer periphery of the armature and the inner periphery of the inner channel of the coil carrier, in order in this respect to obtain a valve that is optimised in terms of a minimised tendency for armature seizure.

It is particularly appropriate if the core is arranged at least in some sections inside the coil carrier, wherein the guide pin then projects into the latter from an end of the winding section facing away from the core. Here a form of embodiment is very particularly preferred in which the core is sealed relative to the coil carrier in the radial direction, in particular via a ring seal provided on the outer periphery of the core, and/or via a ring seal provided on the inner periphery of the coil carrier, so as to prevent any exit of compressed air in the axial direction in a region between the coil carrier and the core.

In principle it is possible for the armature to interact directly with the first and, as appropriate, a second valve seat—however, particularly preferred is a form of embodiment in which the sealing function is implemented by means of a sealing element, more preferably by means of an elastomer part, wherein even more preferably, the sealing element is fitted on the armature in a form fit, in that the sealing element preferably passes through an axial passage opening in the armature, in particular on the end face, and overlaps the edge of the passage opening at both axial sides in the radial direction, which can be implemented, for example, by means of an outer peripheral groove on the sealing element. In particular for the preferred case in which the sealing element passes through a passage opening of the armature to both axial sides and—as a function of the switching position—interacts both with the guide pin, in particular with a valve seat there provided, and with the core, or with a valve seat component optionally provided in the core, the sealing element serves a dual function.

Thus the sealing element operates, in particular, if it is formed as an elastomer part, at both axial sides, as a preferably single damping element, so that the complex spring pin design shown in the prior art can be omitted, and in addition it has a sealing function for purposes of sealing the first valve seat and, if present, for sealing the second valve seat that is then located opposite. This advantageous embodiment of the electromagnetic valve can then in particular, be simply implemented, if the guide pin formed integrally with the coil carrier projects axially into the armature up to radially inside the winding section, as a result of which the respective interactive surfaces come together more closely, for purposes of interaction with the valve seat and the core, than in the prior art. By this means it is advantageously possible in design terms to implement the above-stated dual function of a sealing element.

If one wished to implement an integration of the sealing and damping functions in the case of the valve of known art from DE 41 39 670 C2, this would only be possible in an extremely complex manner by means of elastomer vulcanisation through the armature, or by the installation of a very long elastomer component in the armature. In this case the length of this integral elastomer part would be of the same order as the armature length, and with expansion coefficients of between approximately 130 and $185 \times 10^{-6}$ mm/K typical of elastomer would show typically several tenths of a millimetre temperature expansion, in particular in the typical range of temperature deployment for motor vehicles of between approximately −40° C. and 125° C., in addition to self heating. This expansion would have to be accommodated in the armature stroke, wherein, however, a greater armature stroke design with the same closing force requires over-dimensioning of the magnet with a larger iron and copper content in the flux circuit, and thus in addition to an increased build space requirement, would lead to increases in production costs.

It is particularly preferable if the axial extent of the sealing element, then interacting both with the core side, and also with the pin, is significantly less than the axial extent of the armature. The axial extent of the sealing element is preferably less than 50%, yet more preferably less than 40%, very particularly preferably less than 30%, of the axial extent of the armature. Very particularly preferably the axial extent of the sealing element fulfilling a dual function is selected from a range of values between approximately 10% and 20%, yet more preferably between approximately 15% and 25%, of the axial armature length.

Alternatively it is also conceivable to assign a separate sealing element to each of the valve seats, or to dispense with a sealing element that is separate from the armature completely.

By means of an advantageous form fit connection between the sealing element and the armature, in accordance with a further development, the otherwise usual bonding agent can be omitted. In particular if the function of stop damping is at the same time assigned to the sealing element, preferably at the core end, this serves to provide for a minimising of switching noise, together with a minimising of wear, by avoiding metallic hard stops, and thereby an increase in service life.

As already indicated in the introduction, a form of embodiment of the electromagnetic valve is particularly preferred in which the first valve seat is arranged on the guide pin, in particular on its end face, in particular by forming the valve seat integrally with the guide pin. Alternatively, as referred to, it is possible to arrange the first valve seat on the core, or on a valve seat component arranged in the core, wherein in the last-cited case, the valve seat component at the same time preferably bounds a compressed air channel to the valve seat.

For the case of the arrangement, preferably the formation, of the first valve seat on the guide pin it is preferable if a first fluid channel, in particular a compressed air channel, is formed inside the guide pin, preferably formed as a central channel, which very particularly preferably forms a supply channel, which is supplied from a supply port. When the first valve seat is open, the compressed air can preferably be led away via at least one fluid channel provided on the outer periphery of the guide pin, in particular a working channel leading to a working port. In the case of provision of the first valve seat on the core, or a valve seat element provided on the core, the inflow or outflow of compressed air, to or from the first valve seat respectively, takes place through a channel provided inside the core, or inside a valve seat component.

Above-cited working channels on the outer periphery of the guide pin are preferably formed by axial grooves between guide sections or guide segments spaced apart in the peripheral direction, which bound a, preferably cylindrical, envelope contour for purposes of guiding the then preferred hollow cylindrical armature on its inner periphery.

In the case of a form of embodiment with two axially opposed valve seats, it is preferable if an air-conducting connection is implemented between an armature interior, preferably between at least one channel provided on the outer periphery of the guide pin, and one channel in the core, or in a valve seat component provided in the core, in particular through at least one axial passage opening in the region of an armature end face, so that in the case of an armature sitting against the first valve seat an exchange of air is enabled between the then open core region-side second valve seat and the armature interior, preferably the peripheral-side air channel on the guide pin there emerging.

In production engineering terms it is particularly preferable if the coil carrier and the guide are formed as a common injection-moulded plastic part, preferably with an integral first valve seat, although the latter is not essential if the first valve seat is provided in the region of the core.

In the case of formation of the coil carrier and the guide pin as a common injection-moulded plastic part, it is preferable if the material of the injection-moulded plastic part contains friction-minimising admixtures, in particular PTFE, in order then preferably to be able to dispense with a sliding coating on the outer periphery of the guide pin for purposes of improving the tribological properties. By this means a cost-intensive armature sliding coating can also be omitted.

It is particularly appropriate if the working stroke of the armature can be adjusted, or is adjusted, by the axial displacement and subsequent securing of the core, in particular by crimping of a core section axially projecting from the coil carrier together with a metallic flux guide plate, conducting the magnetic flux, and preferably formed as a valve housing. By this means, an optimised energy efficiency of the electromagnetic drive can be implemented. In addition, such an installation can be well controlled with given tolerances.

The invention also leads onto a safety-related pneumatic system, in particular a (pneumatic) braking system for motor vehicle applications, in particular commercial vehicle applications. In a very particularly preferred manner the safety-related system takes the form of an ABS or EBS braking system, in which an electromagnetic valve designed in accordance with the concept of the invention is deployed, which particularly preferably takes on the function of an ABS brake valve or an EBS brake valve. By virtue of the robust principle of the design the suitability of such safety-related electromagnetic valves for safety-related pneumatic systems is provided.

BRIEF DESCRIPTION OF THE DRAWINGS

Further advantages, features and details of the invention ensue from the following description of preferred examples of embodiment, and with the aid of the figures.

Here.

DETAILED DESCRIPTION

In the figures the same elements, and elements with the same function, are identified with the same reference symbol.

Figure 1:
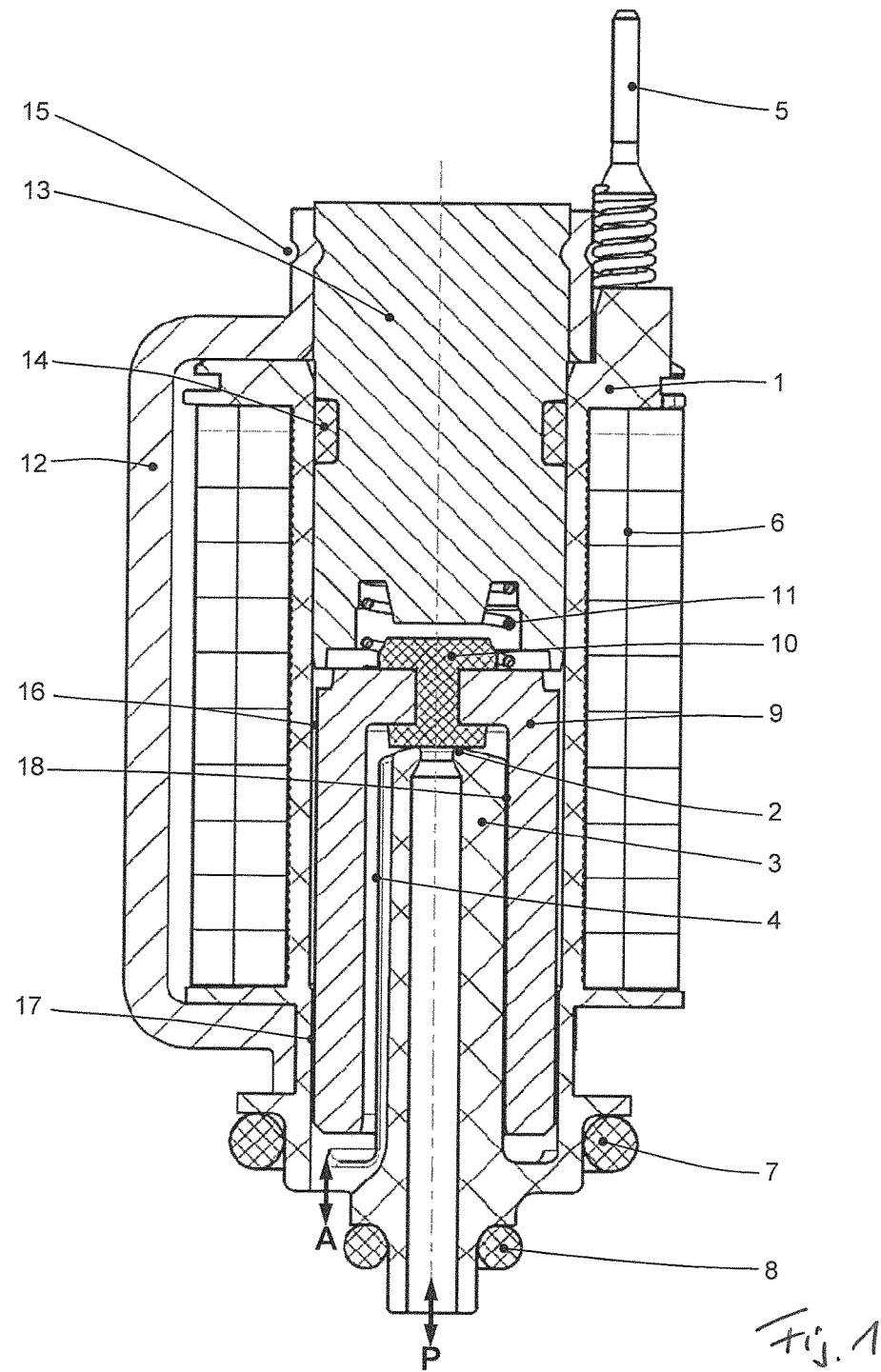
FIG. 1: shows a cross-sectional representation of a closed 2/2-way valve in the unpowered state.

FIG. 1 shows a design of an electromagnetic valve formed in accordance with the concept of the invention as a 2/2-way valve in an embodiment that is closed when current is supplied. A coil carrier 1 formed in plastic can be discerned, which in an axial winding section carries a winding 6, to which current can be supplied. The supply of current to the winding 6 takes place via a contact pin 5. The coil carrier 1 is formed integrally with a guide pin 3, which projects from a side facing away from a core 13 into the winding section, and which, on its outer periphery implements an armature guide 18, for purposes of guiding an armature 9 on its inner periphery when current is supplied to the winding 6. In accordance with a preferred variant the armature 9 is additionally guided on its outer periphery, and in fact on the inner periphery of an inner channel of the armature, into which the guide pin 3 projects axially. When the winding 6 is unpowered, the armature 9, or more precisely, a sealing element 10, here an elastomer, fitted in a form fit on the armature 9, which projects beyond a passage opening in the armature in the direction of an armature interior, interacts with a first valve seat 2 formed on the end face of the guide pin 3. Force is applied onto the armature 9 in the direction onto this valve seat by means of a spring 11, which is supported on the one hand axially on the core 13, and on the other hand, axially opposite on the armature 9.

When current is supplied to the winding 6 the magnetic flux runs inside the core, then in the radial direction outwards into a flux guide plate 12, which at the same time exercises a yoke plate function, and then in the opposite axial direction inside the flux guide plate 12 up to a lower flux guide plate section in the plane of the figure, which is accommodated in a peripheral groove of the coil carrier 1. There the radial clearance to the armature 9 is bridged; inside the armature the flux runs further axially across an axial air gap between armature and core in the direction of the core.

A section of the core 13 is arranged inside the inner channel of the coil carrier 1, and is sealed with respect to the latter by means of a ring seal 14. Axially further outward the core is axially secured by means of crimping 15 it together with a metallic flux guide plate 12, which has a flux-conducting function.

When current is supplied to the winding 6 the armature 9 is displaced axially in the direction of the core 13, on which it is then supported by means of the sealing element 10, to which is assigned not only a sealing function, but also a stop damping function.

The radial guide clearance in the region of the armature guide 17 is less than a radial clearance 16 (air gap) between the outer periphery of the armature 9 and the inner periphery of the inner channel of the coil carrier in the region of the axial winding section.

When the first valve seat is open, i.e. when current is supplied to the winding 6, compressed air can flow via a first fluid channel, formed as a central channel, here a supply channel (P) axially into the armature interior, and out of the latter in the opposite axial direction via second fluid channels 4 formed on the outer periphery of the guide pin 3 to a working port A. Needless to say, the flow through the electromagnetic valve can also be in the opposite direction (the port figures then alter accordingly).

In the installation position the supply port is sealed with respect to the working port via an O-ring seal 8, and the working port is sealed with respect to the environment via an O-ring seal 7 arranged radially further outward.

Figure 2:
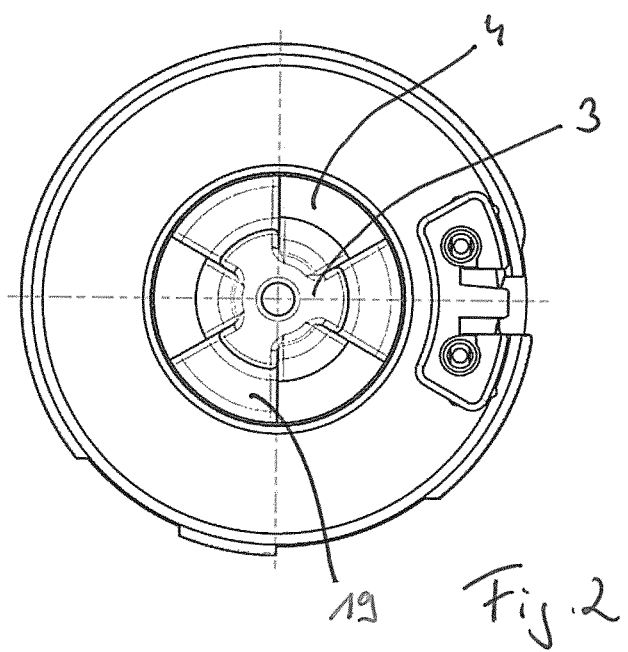
FIG. 2: shows a cross-sectional view through the armature guide of the valve in FIG. 1, FIG. 3: shows a representation of a 2/2-way valve in a variant of embodiment that is open in the unpowered state.

FIG. 2 shows a detail view in the context of a cross-sectional view of the guide pin 3. Three radially projecting guide segments 19 can be discerned, wherein two of the guide segments 19, spaced apart in the peripheral direction, which bound a cylindrical envelope contour, between them bound a channel 4, which in the example of embodiment shown preferably serves as a working air channel.

Figure 3:
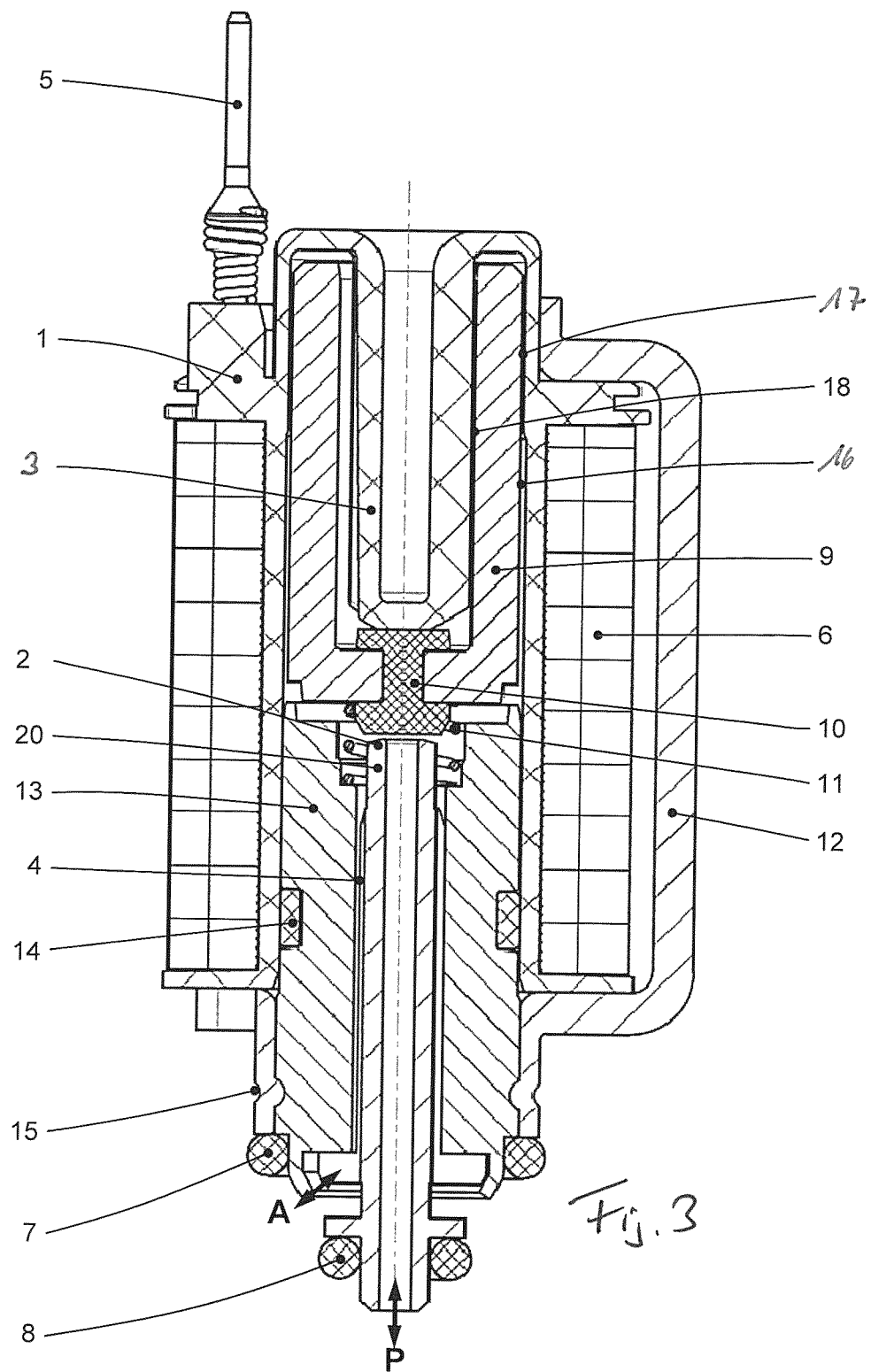

In what follows the example of embodiment in FIG. 3 is now described, wherein for purposes of avoiding repetition it is essentially the differences from the example of embodiment in the previous figures that are entered into. With regard to the common features, reference is made to the previous example of embodiment, together with the description of the figures.

FIG. 3 shows a design of an electromagnetic valve formed in accordance with the concept of the invention as a 2/2-way valve in an embodiment (normally open) that is closed when current is supplied. It can be discerned that the first valve seat 2 is not implemented on the guide pin 3 as in the previous example of embodiment, but instead opposite the guide pin 3 on a valve seat component 20 accommodated in the core 13, which at same time contains a compressed air channel, here a supply channel P, while further channels 4, via which the compressed air can flow out when the first valve seat is open, are implemented on the outer periphery of the valve seat component 20.

In the example of embodiment shown the spring 19 is also located axially between the armature 9 and the core 13. As in the example of embodiment in FIG. 1, here too the coil carrier 1 encompasses the armature 3 axially outwards in the radial direction, in order then to project axially up into the winding section in the shape of the guide pin 3.

Figure 4:
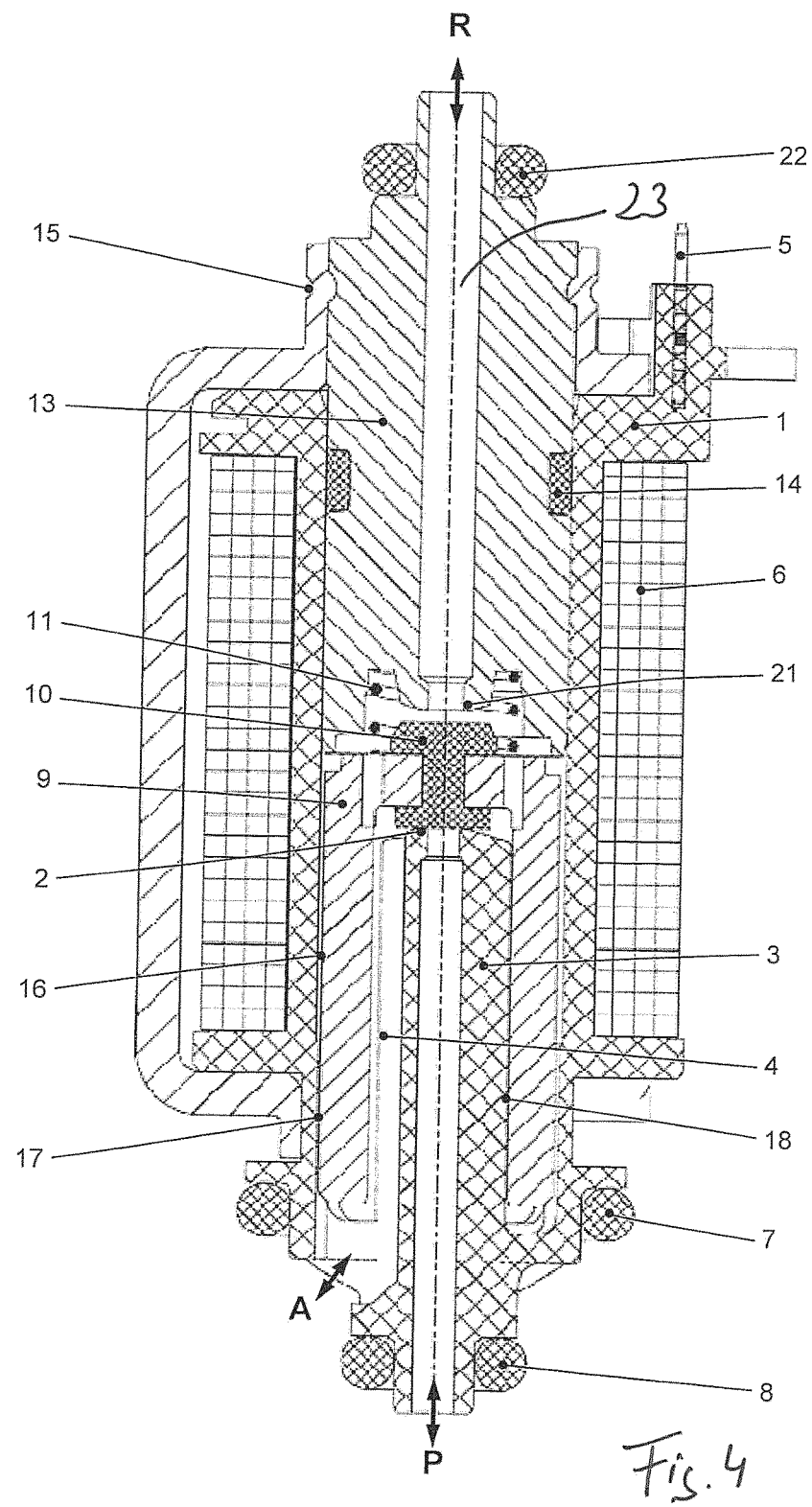
FIG. 4: shows a possible form of embodiment of an electromagnetic valve designed in accordance with the concept of the invention as a 3/2-way valve with two valve seats axially spaced apart.

The example of embodiment of an electromagnetic valve in accordance with FIG. 4 comprises, in addition to the first valve seat 2, formed on the guide pin 3, a second valve seat 21, which is formed axially opposite, here, for example, directly on the core 13, wherein, however, an arrangement on a valve seat element, which is accommodated in the core 13, is alternatively possible.

In the example of embodiment shown the armature 9 interacts via the sealing element 10 with the second valve seat when current is supplied to the winding 6 and when no current is supplied it sits, via the sealing element 10, against the first valve seat 2.

The channels 4 on the outer periphery of the guide pin 3, and/or an armature interior, are permanently connected in an air-conducting manner with a radially adjacent region of the second valve seat 21, so that when the second valve seat 21 is open, and the first valve seat 2 is accordingly closed, a fluid-conducting connection exists between the fluid channel 23 in the core 13, or alternatively in a valve seat element, and the channels 4, while when the first valve seat is open this connection is interrupted and instead a fluid-conducting connection exists between the fluid channel inside the guide pin and the channels 4.

From FIG. 4 it can be discerned that an O-ring seal 22 is assigned to the channel R for purposes of sealing with respect to the environment.

The invention claimed is:

1. An electromagnetic valve for safety-related pneumatic systems in motor vehicles, with an armature (9), which, by means of current supplied to an electrical winding (6), can be displaced axially relative to a core (13) and relative to a first valve seat (2), inside an inner channel of a coil carrier carrying the winding (6) on a winding section, wherein, in the armature (9) is arranged a guide channel, into which projects axially a guide pin (3) formed integrally with the coil carrier (1), so as to guide the armature (9) in the course of its axial displacement, and wherein the coil carrier (1) and the guide pin (3) have the form of a common injection-moulded plastic part, and wherein a radial guide clearance between the outer periphery of the guide pin (3) and the inner periphery of the armature (9) is smaller than a radial clearance between the outer periphery of the armature (9) and the inner periphery of the inner channel of the coil carrier (1).

2. The electromagnetic valve in accordance with claim 1, wherein, the guide pin (3) projects axially into the winding section.

3. The electromagnetic valve in accordance with claim 1, wherein the core (13) is arranged at least in some sections inside the coil carrier, and wherein the guide pin (3) projects into the latter from an end of the winding section facing away from the core (13).

4. The electromagnetic valve in accordance with claim 1, wherein the armature (9) is designed and arranged such that it interacts with the first valve seat (2), via a sealing element (10).

5. The electromagnetic valve in accordance with claim 4, wherein, the sealing element (10) is fitted on the armature (9) in a form fit.

6. The electromagnetic valve in accordance with claim 4, wherein, in a switching position axially displaced away from the first valve seat (2) the armature (9) is supported via the sealing element (10) on a component located opposite the first valve seat (2).

7. The electromagnetic valve in accordance with claim 1, wherein, the first valve seat (2) is arranged on the guide pin (3) or wherein the first valve seat (2) is arranged on the core (13), or on a valve seat component (20) arranged in the core (13).

8. The electromagnetic valve in accordance with claim 1, wherein, to the first valve seat (2) is assigned at least one of a first fluid channel, extending axially inside the guide pin (3) and formed as a supply channel (P), and a second fluid channel designed as a working channel (A), and provided on the outer periphery of the guide pin (3).

9. The electromagnetic valve in accordance with claim 1, wherein the guide pin (3) has at least one of:

at least in one axial guide section, a cylindrical envelope contour, and in the peripheral direction, guide webs spaced apart via axial peripheral grooves, which bound between them second fluid channels.

10. The electromagnetic valve in accordance with claim 1, wherein, the electromagnetic valve has a second valve seat (21), axially spaced apart from the first valve seat (2).

11. The electromagnetic valve in accordance with claim 1, wherein the material of the injection-moulded plastic part contains friction-minimising admixtures.

12. The electromagnetic valve in accordance with claim 1, wherein, a working stroke of the armature (9) can be adjusted, or is adjusted, by the axial displacement and securing of the core (13) by crimping of a core section axially projecting from the coil carrier (1) together with a metallic flux guide plate (12), conducting the magnetic flux, and preferably formed as a valve housing.

13. A safety-related pneumatic system, in particular a braking system for motor vehicle applications having an electromagnetic valve in accordance with claim 1.

14. The electromagnetic valve in accordance with claim 2, wherein the guide pin (3) projects axially into the winding section over at least a quarter of the axial extent of the winding (6).

15. The electromagnetic valve in accordance with claim 4, wherein the sealing element (10) is an elastomer part.

16. The electromagnetic valve in accordance with claim 5, wherein the sealing element (10) is held in a passage opening of the armature (9), wherein the passage opening has two axial sides, and wherein the sealing element (10) overlaps an edge of the passage opening at the two axial sides in the radial direction.

17. The electromagnetic valve in accordance with claim 7, wherein the first valve seat (2) is arranged on an end face of the guide pin (3) and is integrally formed with the guide pin (3).

18. The electromagnetic valve in accordance with claim 10, wherein the second valve seat (21) is arranged on or formed integrally with the core (13).

* * * * *